June 1, 1926.  1,587,437

W. H. STURGE

CABLE, CORD, AND LIKE WINDING OR ABSORBING DEVICE

Filed July 3, 1925   2 Sheets-Sheet 1

Inventor
Wilson Henry Sturge

By
Attorney

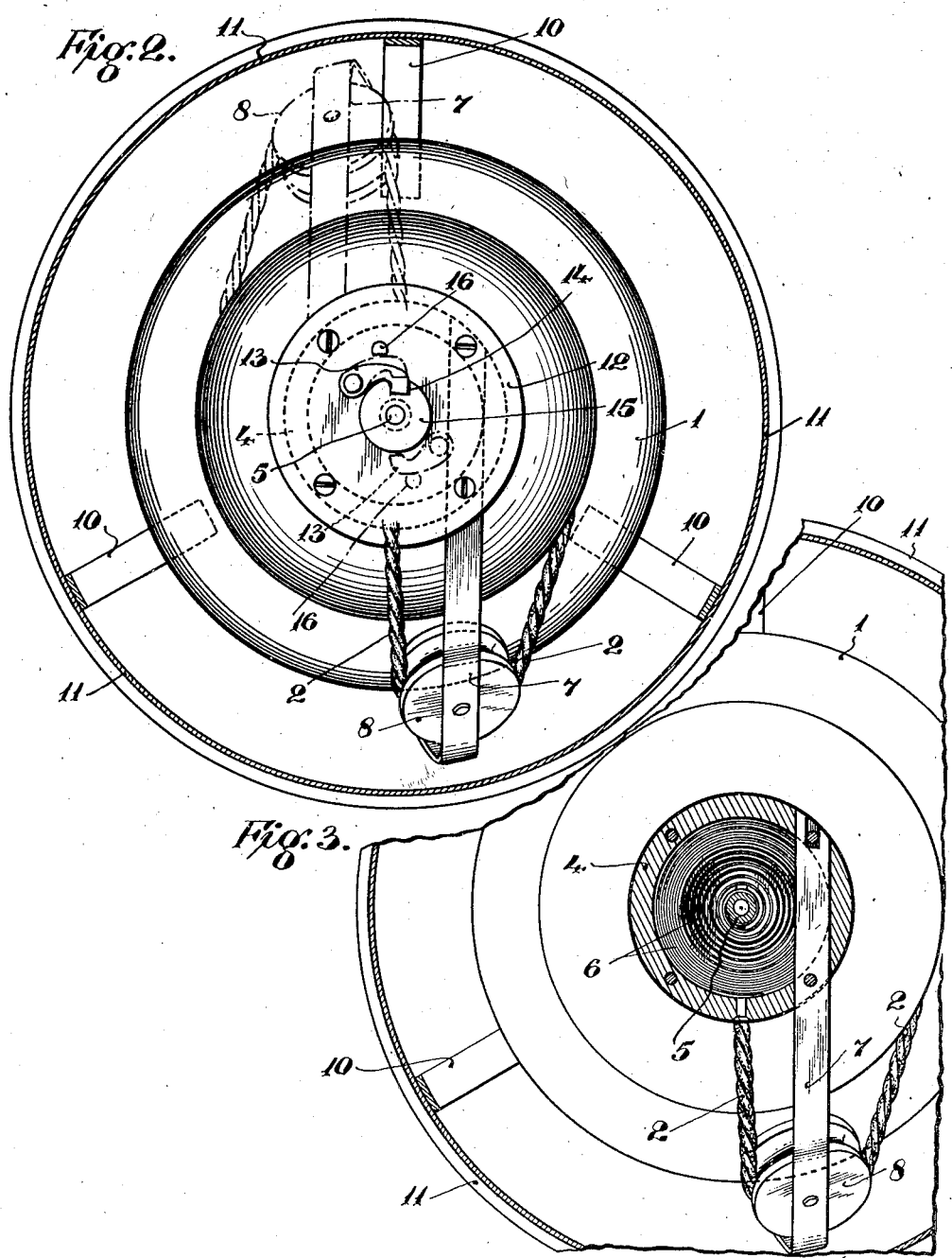

Patented June 1, 1926.

1,587,437

UNITED STATES PATENT OFFICE.

WILSON HENRY STURGE, OF BIRMINGHAM, ENGLAND.

CABLE, CORD, AND LIKE WINDING OR ABSORBING DEVICE.

Application filed July 3, 1925, Serial No. 41,368, and in Great Britain July 10, 1924.

This invention relates to cable, cord and like winding or absorbing devices, such, for example, as are employed for taking up the slack in the flexible wires or cables of electric lamps, whilst at the same time allowing the wire or cable to be drawn out to the desired extent.

Hitherto, in such devices the wire or cable has been wound around a rotatable drum actuated by a spring.

According to the present invention the drum upon which the cable, cord or the like is wound is fixed instead of being rotatable, and is capable of being secured to a wall, ceiling or other support, the said cord or cable being adapted to be wound around the fixed drum by an arm or guide which is carried or actuated by a rotatable spring-actuated drum or member. Owing to the drum upon which the cable is wound being fixed it is not necessary for the cable to be wound thereon in opposite directions, as in the case of a rotatable drum, and the disadvantages due to the use of rubbing contacts are avoided, whilst the size of the drum is not limited in any way, so that it may be arranged to carry any desired length of cable. The rotatable drum or member is preferably concentric with the fixed drum and carries a tangentially-disposed arm having a roller at its outer end over which the cable is passed so that the latter is automatically wound around the fixed drum as the arm rotates.

A further feature of the invention consists in the fixed drum carrying a stationary frame or casing enclosing the said fixed drum and the revolving member, and provided at its forward end with a central guide sleeve through which the cord or the like passes from the fixed drum in a forward direction.

Another feature is the provision of an automatic catch device for holding the spring drum with the cord or the like, drawn off to any required length, said device consisting of a gravity pawl adapted to engage a recess in a disc or the like on the fixed spindle and to be withheld from engagement with said recess during the rotation of the drum, by the action of centrifugal force.

Figure 1 of the accompanying drawings represents a vertical section through a cord-absorbing device constructed in accordance with the present invention.

Figure 2 is an end view of the device with the enclosure frame and casing in section.

Figure 3 represents a cross-section through the spring drum, showing how the pulley-carrying arm is attached thereto.

Figure 1:
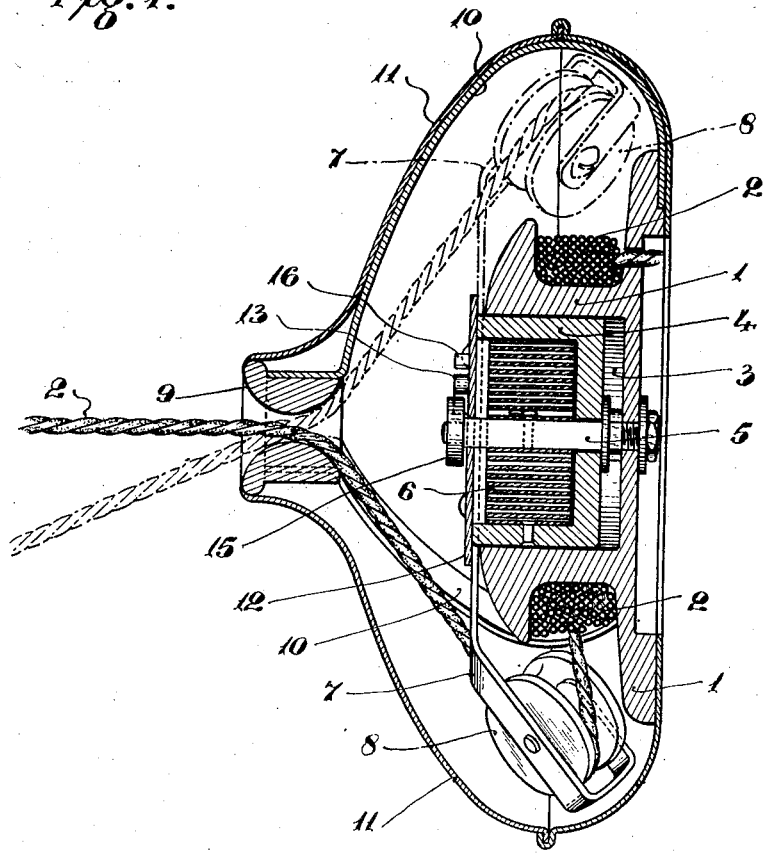

Referring to the drawings, the improved device comprises an outer fixed drum 1 upon which the cable, cord or the like 2 is adapted to be wound, the said drum 1 being adapted to be secured in a vertical plane to a wall or to any other suitable fixed support. Arranged concentrically within a recess 3 in the front face of this fixed drum is an inner drum 4 which is rotatably mounted upon a central shaft 5 secured at its rear extremity to the rear wall of the recessed portion of the fixed drum so as to project forwardly therefrom. This inner rotatable drum 4 contains a volute-coiled spring 6 fixed at one end to the shaft 5 and at the other end to the drum 4. Attached to the end of the drum 4 is a tangentially-arranged arm 7 extending outwards beyond the periphery of the fixed outer drum 1, its outer end being bent inwards so as to extend over the said periphery of the latter, and being arranged to carry a pulley or roller 8. The latter may be rotatably attached to the arm in any suitable manner. Preferably, however, the end of the arm is bent into a U-shape to receive the roller which may be mounted upon a pivot-pin passing through bearings in the arms of the said U-shaped end. The pulley or roller 8 is so arranged that it lies over the periphery of the fixed drum at an angle thereto, and when the inner spring-actuated drum 4 is rotated the pulley is caused to move concentrically around the said periphery. The cable 2, which may be the flexible lead of an electric lamp, is passed through a hole in the rear flange of the said fixed drum and is coiled around its grooved periphery, the outer end of the cable being passed over the guide pulley 8 and is then passed through a further guide eye or member 9 which maintains the cable in engagement with the pulley 8. This guide 9 comprises a short fixed sleeve or bush carried by three radially-directed arms 10 forming a stationary frame attached to the inner end of the fixed drum so as to enclose said drum and the arm 7, the guide sleeve 9 being disposed centrally, forwardly of the inner and outer drums. A sheet-metal casing 11 may be secured to or supported upon the arm 10. The pulley 8 is set at an angle which is directed towards the guide eye 9.

The inner drum 4 is wound against the action of the spring 6 so that the latter is put in a state of tension. The said drum when released thus moves in the opposite direction and causes the pulley or roller 8 to move around the periphery of the outer drum, the cable passing over the pulley being consequently wound around the periphery of the latter and being drawn through the central guide sleeve 9. The cable may be pulled out through the guide sleeve 9 to the length desired causing the arm 7 carrying the pulley or roller to revolve about the shaft 5 (such as shown by dotted lines in Figure 1) so that the spring 6 is further tensioned ready for the automatic rewinding of the cable when the latter is released. A suitable catch may be provided for holding the arm or rotatable drum in any desired position with the cable extended to any desired degree. Thus, pivoted to a plate 12 secured to the end of the spring drum 4 is a gravity pawl 13 the free end of which is adapted to engage a notch or recess 14 in a disc 15 fixed upon the forward end of the central shaft 5. When the cable is drawn out to the required extent, the pawl will wipe over the periphery of the disc 15 and the notch therein, but if the cable is then held stationary or (if the pawl is not opposite to the notch) allowed to rewind slowly for a portion of a revolution of the spring drum, the said pawl will drop into the notch and thus hold the spring drum against rotation. If, however, the cable is allowed to rewind quickly under the unrestrained influence of the spring drum, the pawl will move outwards by centrifugal action as shown by dotted lines as in Figure 2, and will not engage the notch, so that the cable will be absorbed and wound on to the drum to the extent desired. A stop 16 is provided to prevent the pawl from moving outwards too far.

The improved device may be fixed to the wall or to any other suitable support, and may be used as a winder for the cables of electric lamps or telephones; or it may be employed as a winder or slack absorber for other cords, cables or the like. It may with advantage be used for the cables of inspection lamps of motor vehicles for use in garages and the like, or for the cables of lamps used on lathes, cranes or other machinery or the like where a cable of varying length is desirable.

Having fully described my invention, what I desire to claim and secure by Letters Patent is:—

1. A cable-winding device comprising a fixed drum adapted to be secured to a support, a spring-actuated rotatable member coaxial with the fixed drum, a revolving cable guiding and winding device carried by said member and adapted to wind the cable around the fixed drum, and a stationary member enclosing the fixed drum and cable guiding and winding device, said stationary member being provided at its outer end with a central cable-guide eye in alignment with the axis of the drum and through which the cable proceeds before passing over the revolving guiding and winding device to the fixed drum.

2. A cable-winding device comprising a fixed drum adapted to be secured to a support, a spring-actuated rotatable member coaxial with the fixed drum, a revolving cable guiding and winding device carried by said member and adapted to wind the cable around the fixed drum, said cable guiding and winding device including a guide pulley disposed outside the periphery of the fixed drum, and a stationary member enclosing the fixed drum and cable guiding and winding device, said stationary member being provided at its outer end with a central cable guide eye in alignment with the axis of the drum and through which the cable proceeds before passing over the guide pulley to the fixed drum, the guide pulley being disposed at an angle directed towards the said guide eye.

3. A cable-winding device comprising a fixed drum adapted to be secured to a support and having a recess at its front face, a fixed spindle arranged centrally in the recess and carried by the end wall of said recess, a spring-actuated drum rotatably mounted upon the fixed spindle so as to be housed within the recess, said drum containing a volute spring, the inner end of which is attached to the central fixed spindle while the outer end is attached to the rotatable drum, an outwardly-projecting arm carried by said spring-actuated drum and passing over the front face of the fixed drum, a guide-roller carried by the outer end of the arm, said guide-roller being disposed outside the periphery of the fixed roller, and a stationary member enclosing the fixed drum and guide-roller, said stationary member being provided at its outer end with a central cable guide eye in alignment with the axis of the drum and through which the cable proceeds before passing over the guide-roller to the fixed drum, the guide roller being disposed at an angle directed towards the said guide eye.

In testimony whereof I have hereunto set my hand.

WILSON HENRY STURGE.